Oct. 23, 1951 R. W. LIDDELL, JR 2,572,359
MAKING GLASSY PHOSPHATE COMPOSITIONS
Filed Dec. 12, 1949      2 SHEETS—SHEET 1

INVENTOR
Robert W. Liddell Jr.

Oct. 23, 1951  R. W. LIDDELL, JR  2,572,359
MAKING GLASSY PHOSPHATE COMPOSITIONS
Filed Dec. 12, 1949  2 SHEETS—SHEET 2

INVENTOR
Robert W. Liddell Jr.

Patented Oct. 23, 1951

2,572,359

UNITED STATES PATENT OFFICE 2,572,359

MAKING GLASSY PHOSPHATE COMPOSITIONS

Robert W. Liddell, Jr., Bethel Township, Allegheny County, Pa., assignor to Calgon, Incorporated, Pittsburgh, Pa., a corporation of Pennsylvania Application December 12, 1949, Serial No. 132,467

14 Claims. (Cl. 252—135)

This invention relates to a process for treating powdered water-soluble alkali-metal phosphate glass.

My process may best be understood by stating that it involves the steps of subjecting the powdered glass while gas-borne successively to a humidifying atmosphere and then to a drying atmosphere so that it is first rendered tacky and thereafter non-tacky. More patricularly, I maintain a gaseous humidifying zone and a contiguous gaseous drying zone, disperse the powdered glass in the humidifying zone, carry it through the humidifying zone, carry it to and through the drying zone all the while maintaining it in gaseous suspension whereby the individual particles are first subjected to humidifying conditions and thereafter to drying conditions while gas-borne so that the surface of the individual glass particles are first rendered tacky and thereafter rendered essentially non-tacky.

The product of my process is ordinarily sufficiently friable to be readily crushed between the thumb and forefinger. As will appear in detail herein below it is desirable that the product be in this form and be relatively free from dense material which offers materially greater resistance to crushing.

The process of this invention may be used to produce either a light friable agglomerated product, a pulverulent material or a mixture of both having as a major constituent a water-soluble alkali-metal phosphate glass having a molar ratio of alkali metal oxide to phosphorus pentoxide between about 0.9:1 and about 1.7:1, coated with one or more desired compatible water-soluble ingredients. For example, a product having a water soluble phosphate glass base coated with a thin coating of trisodium phosphate for adjusting the pH of the solution in which the glass is ultimately dissolved may be produced. Such a material may be produced by dispersing substantially simultaneously the phosphate glass and the desired water-soluble ingredient or ingredients in the humid zone and thereafter following the steps outlined above so that the surfaces of the individual glass particles are first rendered tacky and coated by contact with the powdered ingredient and then rendered essentially non-tacky while retaining the coating of powdered ingredient. A product similar to that described by Munter in his copending application Serial No. 651,016 now Patent No. 2,494,828 and having similar desirable water-soluble properties may be produced by my process by dispersing substantially simultaneously the phosphate glass and a powdered water-soluble alkali-metal compound which releases a gas when reacted in water solution with said treated phosphate glass in the humid zone and then following the remaining steps outlined above so that the surfaces of the individual glass particles are first rendered tacky and coated with the alkali-metal gas-releasing compound and then rendered essentially non-tacky while retaining the coating of gas-releasing compound.

The process of my invention is preferably carried out by dispersing the phosphate glass into a jet of humidifying gas under pressure, such as steam, transferring the glass to a contiguous drying zone produced by a moving stream of dry hot air and maintaining it in gaseous suspension until the surfaces of the individual glass particles will be first rendered tacky and then rendered essentially non-tacky.

The process is carried out in an apparatus the preferred form of which is illustrated in the drawings wherein.

Figure 1:
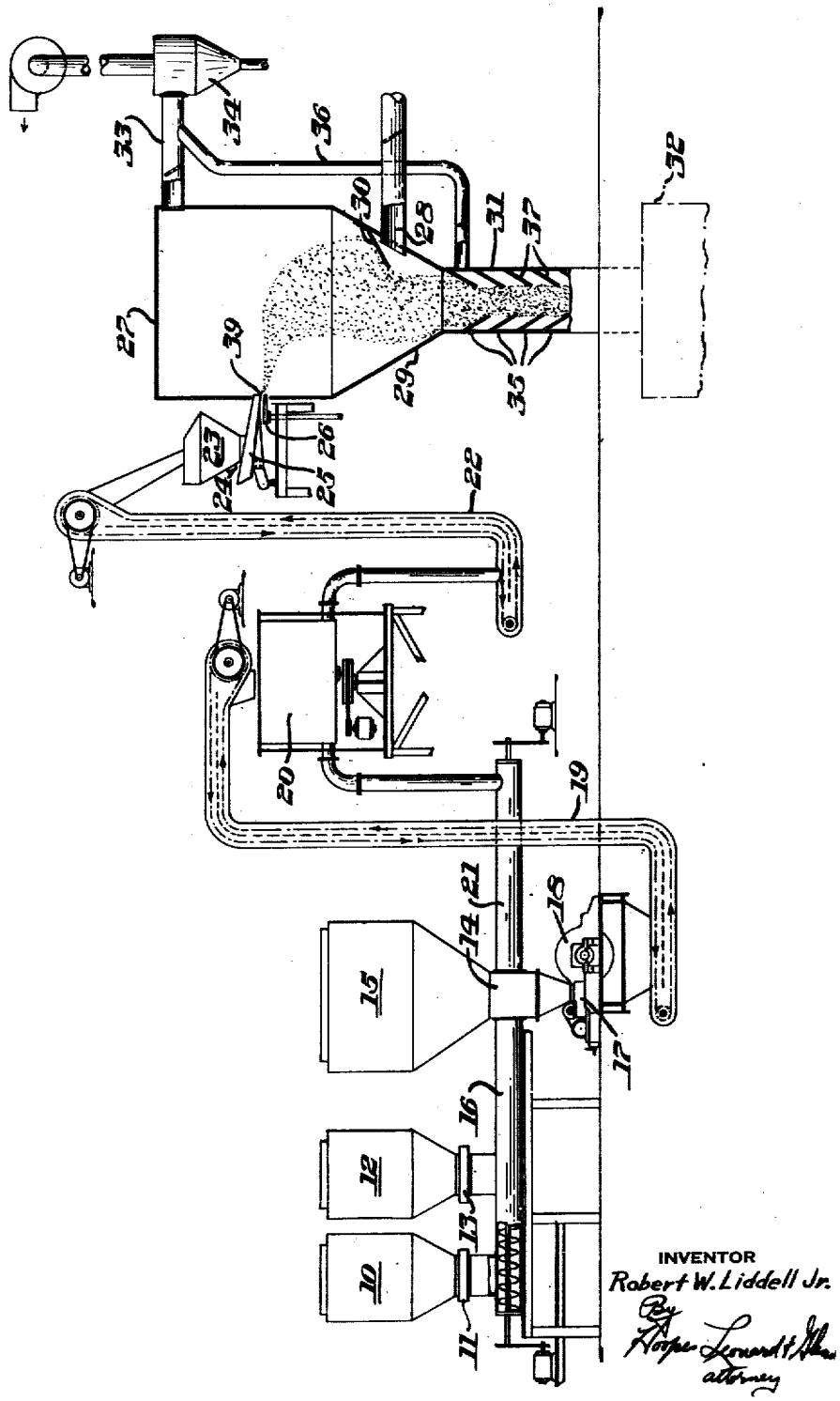
Figure 1 is a generally diagrammatic showing of the apparatus used in my process.
Figure 2:
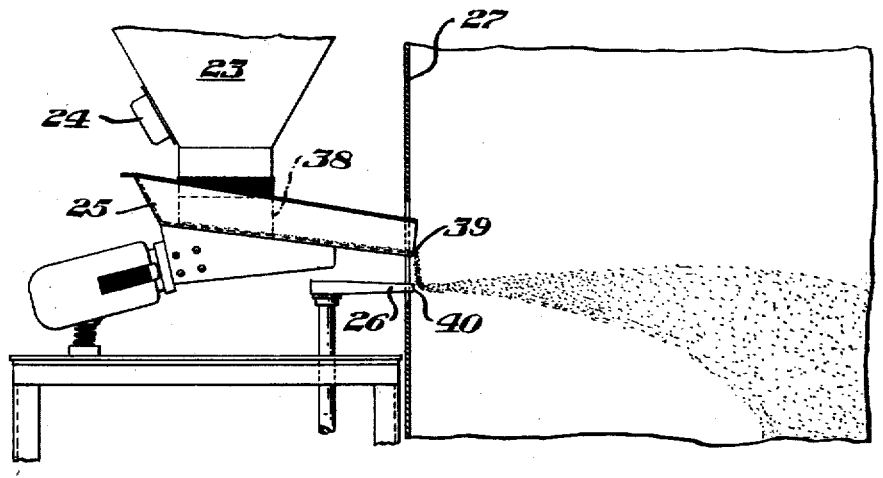
Figure 2 is a segmental section through the apparatus at the humidifying jet.

Referring to the drawings I have illustrated an apparatus for producing a water-soluble phosphate glass having a molar ratio of alkali-metal oxide to phosphorus pentoxide between about 0.9:1 and about 1.7:1 coated with a gas-releasing substance. As shown in the drawing the coating materials are fed from a soda-ash storage bin 10 and proportioner 11 and a sodium bicarbonate storage bin 12 and proportioner 13 to the outlet 14 of a phosphate glass storage bin 15 by a screw conveyor 16. The outlet 14 empties into the screw conveyor 17 of a pulverizer 18 in which the soda-ash, sodium bicarbonate and phosphate glass are mixed and ground together to pass through a 40 mesh or finer screen. The finely ground materials fall onto a chain conveyor 19 which discharges them into a vibrating screen 20 where the oversize particles are separated from the fines and returned to the outlet 14 by a screw conveyor 21. The fine material from the vibrating screen falls onto a chain elevator 22 which carries it to a hopper 23. The hopper 23 is vibrated by an electromagnetic pulsating vibrator 24 of the "Syntron" type which feeds a substantially uniform layer of the powdered material to a vibrating feeder pan 25 such as the "'Syntron F-22." The mixture of soda ash, sodium bicarbonate and phosphate glass is fed from the edge of the feeder pan 25 in a film or layer which drops across the path of a jet of steam issuing from a steam nozzle 26. The jet of steam picks up the powdered material and carries it toward the center of a chamber 27 and into a stream of upwardly moving warm air from an air inlet 28 in the hopper bottom 29 of the chamber.

As the mixture is carried by the jet of steam and the upwardly moving warm air the particles of phosphate glass appear to first pick up a film of moisture which renders them tacky whereupon they are either individually coated with the particles of soda-ash and sodium bicarbonate or they are agglomerated together as larger particles which are coated with soda-ash and sodium bicarbonate and then they appear to be at least partially dehydrated rendering them essentially non-tacky while maintaining the desired discreteness of particles and avoiding the formation of hard, dense masses. While these changes in surface condition are occurring the particles are gas-borne but are falling through the chamber 27 toward the hopper bottom 29. In order to prevent the coated particles from obstructing the warm air inlets 28 and to protect the particles themselves from direct impingement by the air stream as it leaves the inlets a baffle 30 is attached to the walls of the chamber 27 and the hopper bottom 29 of the chamber. The coated particles of phosphate glass falling from the air stream are directed by the hopper bottom 29 and baffle 30 into a delivery chute 31 leading to a product storage bin 32 (partially shown in chain lines) from which the coated product may be packaged.

The residual gaseous stream of steam and warm air is carried out of the chamber 27 by an outlet pipe 33 and discharged into the atmosphere through a cyclone separator 34 which removes any particles of the mixture of phosphate glass, etc. carried by the gaseous stream.

The product is cooled before reaching the storage bin 32 by drawing a stream of cooling air through openings 35 in the sides of the delivery chute 31. The cooling air is removed from the top of the delivery chute by an auxiliary outlet pipe 36 branching from the outlet pipe 33 between the chamber 27 and the cyclone separator 34. Baffles 37 are arranged in the delivery chute 31 above the openings 35 to direct the product away from the openings.

In order to more clearly illustrate the step of feeding the powdered material into the steam jet the feeder and jet are shown to enlarged scale in Figure 2. Figure 2 shows that the powdered mixture of phosphate, soda-ash and sodium bicarbonate is preferably dispersed across the surface of the vibrating feed-pan in a layer of substantially uniform thickness by a levelling spout 38 attached to the feed hopper 23 and is then fed from the lip 39 of the feed-pan 25 in a film or layer of that same thickness into a jet of steam issuing from a steam nozzle having a long narrow opening 40 substantially equal in length to the width of the lip 39 of the feed-pan 25.

As illustrative of some of the compositions, both water-softening and detergent, which have been produced by my process, I cite the following examples:

*Example I*

94% sodium phosphate glass
6% soda carbonate

*Example II*

84% sodium phosphate glass
11% sodium bicarbonate
5% soda carbonate

*Example III*

80% sodium phosphate glass
10% sodium bicarbonate
10% soda carbonate

*Example IV*

84% sodium phosphate glass
8% sodium bicarbonate
8% soda carbonate

*Example V*

75% sodium phosphate glass
5% soda carbonate
20% sodium tripolyphosphate

*Example VI*

40% sodium phosphate glass
40% sodium metasilicate
10% disodium phosphate
10% sodium carbonate

*Example VII*

30% sodium phosphate glass
30% soda carbonate
30% sodium metasilicate
10% disodium phosphate To these or various other mixtures may be added any of the commonly used wetting agents such as the alkyl sulfonates, the alkyl aryl sulfonates, polyalkoxyalkyl phenols, etc. or any of the common antifoaming agents such as trioctyl phosphate, zinc stearate, mineral oils, etc. Soaps may also be used in place of or in combination with the non-soap type of detergents illustrated in the examples.

In every case, however, the sodium phosphate glass is a major component which is substantially simultaneously dispersed with the remaining ingredients into a steam jet in the same manner as the product described above in referring to the drawings.

In practicing the process of my invention, it is important to control the velocity and amount of the steam issuing from the jet so that the powder does not fall directly through the steam but is carried outward from its normal fall at least several inches. It is also important to avoid extremely high velocities which would tend to blow excessive amounts of the product out through the exhaust or drive the tacky particles of phosphate glass against the opposite wall of the chamber before they are rendered non-tacky by the warm air. The optimum steam velocity is dependent upon the rate of loading (i. e., the weight of material treated per unit time), the particle size of the raw materials fed into the jet, the relative temperatures of the steam and raw materials, and other variables. However, the optimum steam velocity can readily be determined in practice by recognizing that the powdered phosphate must be suspended in the steam and carried into the gaseous drying zone and at the same time be rendered tacky. In practice I have found the optimum steam velocity to vary from as little as 60 ft. per second to 250 ft. per second and in some cases to as high as 350 ft. per second.

If uniform density of the product is of importance, the rate of loading becomes critical and must be controlled. Where all other conditions are constant the density of the product will increase as the loading increases.

In order to produce a product having a satisfactory density the powdered material should be relatively cool when exposed to the steam. Satisfactory bulking is apparently dependent upon the absorption of water on the surface of the phosphate glass particle with the resulting formation of a tacky surface which promotes agglomeration with other glass particles and the coating materials. This condition can be met only if the material fed into the steam is at a lower temperature than the steam. At higher temperatures in the order of 200° F. and above, satisfactory hydration products are formed on the surface of the phosphate glass particles with resulting good solubility characteristics but, at these high temperatures the particles do not become very tacky and, as a result, agglomeration and bulking is not obtained.

The drying conditions do not appear to be very critical. They depend to a great extent upon the temperatures of the steam jet and the original powder. Temperatures between 135° and 500° F. give uniformly good results. The one important criterion with respect to drying times and temperatures is that the material remain gas-borne until essentially non-tacky in order to prevent agglomeration of the product into large dense masses.

The most desirable average density is obtained when the particles absorb several percent by weight of moisture during the humidifying step and are then dried. Satisfactory materials have been obtained where the absorbed moisture varied between about 0.5 to about 6.0 percent on the weight of the glass and the remaining moisture on the dried product constituted about 0.05 percent to about 2.5 percent of the weight of the particles. In general the only actual limitations on absorbed water and residual moisture after drying are (1) that the absorbed water in the humidifying step be sufficient to render the glass particles at least slightly tacky and (2) the residual moisture after drying be such that the particles are essentially non-tacky.

The equipment which is exposed to the steam and the powder should be above the dew point of the atmosphere adjacent it in order to prevent condensation of moisture on the surface of the equipment. If moisture is permitted to collect on the equipment, the powder will stick and build up on the surfaces which it strikes.

The material must be suspended, i. e. gas-borne, if a satisfactory product and rate of production is to be maintained. If material in bulk is subjected to steaming without being suspended, the surface will be overtreated and of poor bulk density and solubility, while the material beneath the surface layer will be protected from the action of the steam by the surface crust.

The length of time of exposure to the action of steam determines to a large extent the hardness of the aggregates resulting from this process. Long periods of exposure to steam produces harder aggregates. The harder aggregates have poorer solubility characteristics than softer aggregates. It is apparent, therefore, that for greatest water solubility the aggregates produced by relatively short exposure to the steam are most desirable.

The steam should be substantially dry in order to prevent water "spitting" from the jet and forming hard, dense aggregates with the glass. This may be controlled by the use of a water trap or other suitable means prior to the steam jet. It may also be controlled by superheating the steam as taught by the Markson application Serial No. 132,473, filed simultaneously herewith.

The phosphate glasses which I prefer to use are those commonly used for water conditioning purposes. These glasses are generally within the range of molar ratios of alkali-metal oxide and phosphorus pentoxide between about 0.9:1 to about 1.5:1. A wide range of phosphate glasses may, however, be used with satisfactory results. The practical limit appears to lie between the range of about 0.7:1 and about 1.7:1.

While sodium phosphate glasses are preferred in the practice of my process other alkali-metal phosphate glasses may be employed, such as those of potassium, lithium, rubidium and ammonium, or fused or mechanical mixtures of such glasses. I include ammonium as an alkali-metal for purposes of this application since its behavior in the particular environment is similar to that of the remainder of the group set out above. The alkali-metal phosphate glasses may contain the usual impurities such as water of constitution, boric oxide, silica, calcium oxide, magnesium oxide, etc. Various adjusting agents, acid or alkaline, may also be added to the glass to impart the desired pH to the water in which the glass is ultimately dissolved.

While in making one of my preferred compositions in the equipment described in referring to the drawings, the phosphate glass particles are coated with a mixture of sodium carbonate and sodium bicarbonate as the gas-releasing substance, other gas-releasing materials or other compatible ingredients may be added or the glass particles may have only a layer of hydration product on their surfaces. For example, sodium sulphite, sodium carbonate alone, or sodium bicarbonate alone or their corresponding counterparts of the other alkali-metals may be used as the gas-releasing substance. Other ingredients may be similarly added for purposes other than gas-releasing such as pH adjusting materials, wetting agents and detergent materials either of soap-type or non-soap-type or mixtures of both. As has already been pointed out, the treated phosphate glass having only a hydration product on its surfaces may be produced by this process by merely feeding the powdered glass into the steam jet. Such a glass having only the hydration product on its surfaces has many commercially desirable characteristics such as bulk, freedom of flow, and resistance to water absorption which distinguish it from the untreated powder.

While I have illustrated and described a preferred practice of my invention it is to be understood that the invention is not so limited but may be otherwise embodied within the scope of the following claims.

I claim:

1. The process of treating a powdered water-soluble alkali-metal phosphate glass having a molar ratio of alkali-metal oxide to phosphorus pentoxide between about 0.9:1 and about 1.7:1 which comprises maintaining a gaseous humidifying zone and a contiguous gaseous drying zone, dispersing the powdered glass in the humid zone, carrying it through the humid zone, carrying it to and through the drying zone, all the while maintaining it in gaseous suspension, whereby the individual particles are first subjected to humidifying conditions and thereafter to drying conditions while gas-borne, so that the surfaces of the individual glass particles are first rendered tacky and thereafter rendered essentially non-tacky while agglomeration of the particles into large dense masses is avoided, and then collecting the product as a loose friable, finely divided mass.

2. The process of treating a powdered water-soluble alkali-metal phosphate glass having a molar ratio of alkali-metal oxide to phosphorus pentoxide between about 0.9:1 and about 1.7:1 which comprises maintaining a gaseous humidifying zone and a contiguous gaseous drying zone, dispersing the powdered glass in the humid zone, carrying it to and through the drying zone, all the while maintaining it in gaseous suspension, whereby the individual particles are first subject to humidifying conditions until an amount of moisture equivalent in weight to about 0.5 to 6.0 per cent of the weight of the glass has been absorbed thereon and thereafter to drying conditions while gas-borne, until the moisture remaining constitutes about 0.05 per cent to about 2.5 per cent of the weight of the particles, so that the surfaces of the individual glass particles are first rendered tacky and thereafter essentially non-tacky while agglomeration of the particles into large dense masses is avoided, and then collecting the product as a loose friable, finely divided mass.

3. The process of making a finely divided material having as basic constituents a major proportion of a water-soluble alkali-metal phosphate glass having a molar ratio of alkali-metal oxide to phosphorous pentoxide between about 0.9:1 and about 1.7:1 and a desired compatible water-soluble ingredient, which comprises maintaining a gaseous humidifying zone and a contiguous drying zone, dispersing substantially simultaneously the phosphate glass and the desired ingredient in the humid zone, carrying them through the humid zone, carrying them to and through the drying zone, whereby the individual particles are first subjected to humidifying conditions and thereafter to drying conditions while gas-borne, so that the surfaces of the individual glass particles are first rendered tacky and coated with the desired ingredient and thereafter essentially non-tacky while retaining the coating of desired ingredient and while agglomeration of the particles into large dense masses is avoided, and then collecting the product as a loose friable, finely divided mass.

4. The process of making a finely divided water-soluble water-treating composition having as basic constituents a treated water-soluble alkali-metal phosphate glass having a molar ratio of alkali-metal oxide to phosphorus pentoxide between about 0.9:1 and about 1.7:1 and a powdered, solid, water-soluble alkali-metal compound which releases a gas when reacted in water solutions with said treated phosphate glass, which comprises maintaining a gaseous humidifying zone and a contiguous drying zone, dispersing substantially simultaneously the untreated phosphate glass and the alkali-metal compound in the humid zone, carrying them through the humid zone, carrying them to and through the drying zone, whereby the individual particles are first subjected to humidifying conditions and thereafter to drying conditions while gas-borne, so that the surfaces of the individual glass particles are first rendered tacky and coated with the powdered alkali-metal gas-releasing compound and thereafter rendered essentially non-tacky while retaining the coating of alkali-metal gas-releasing compound and avoiding agglomeration of the particles into large dense masses, and then collecting the product as a loose friable, finely divided mass.

5. The process of making a finely divided water-soluble material having as basic constituents a major proportion of a water-soluble alkali-metal phosphate glass having a molar ratio of alkali-metal oxide to phosphorus pentoxide between about 0.9:1 and about 1.7:1 and a desired compatible water-soluble ingredient, which comprises feeding the phosphate glass and the minor ingredient into a jet of steam, transferring them to a gaseous drying zone whereby the individual particles are first subjected to humidifying conditions and thereafter to drying conditions while gas-borne so that the surfaces of the individual glass particles are first rendered tacky and coated with the desired ingredient and thereafter rendered essentially non-tacky while retaining the coating of desired ingredient and while agglomeration of the particles into large dense masses is avoided, and then collecting the product as a loose friable, finely divided mass.

6. The process of treating a water-soluble alkali-metal phosphate glass having a molar ratio of alkali-metal oxide to phosphorus pentoxide between about 0.9:1 and about 1.7:1, which comprises feeding the powdered glass into a jet of steam, transferring it to a contiguous gaseous drying zone whereby the individual particles are first subjected to humidifying conditions and thereafter to drying conditions while gas-borne, so that the surfaces of the individual glass particles are first rendered tacky and thereafter rendered essentially non-tacky while agglomeration of the particles into large masses is avoided, and then collecting the product as a loose friable, finely divided mass.

7. The process of making a finely divided water-soluble material having as basic constituents a treated water-soluble alkali-metal phosphate glass having a molar ratio of alkali-metal oxide to phosphorus pentoxide between about 0.9:1 and about 1.7:1 and a powdered solid, water-soluble alkali-metal compound which releases a gas when reacted in water solutions with said treated phosphate glass, which comprises feeding the mixed untreated powdered particles of phosphate and gas-releasing material into a jet of humidified air under pressure, transferring them to a contiguous gaseous drying zone whereby the individual particles are first subjected to humidifying conditions and thereafter to drying conditions while gas-borne so that the surfaces of the individual glass particles are first rendered tacky and coated with the powdered alkali-metal gas-releasing compound and thereafter rendered essentially non-tacky while retaining the coating of alkali-metal gas-releasing compound and avoiding agglomeration of the particles into large masses, and then collecting the product as a loose friable, finely divided mass.

8. The process of treating a powdered water-soluble alkali-metal phosphate glass having a molar ratio of alkali-metal oxide to phosphorus pentoxide between about 0.9:1 and about 1.7:1 which comprises feeding the powdered glass into a jet of humidifying vapor, transferring the glass to a contiguous gaseous drying zone, all the while maintaining it in gaseous suspension, whereby the individual particles are first subjected to humidifying conditions and thereafter to drying conditions while gas-borne, so that the surfaces of the individual glass particles are first rendered tacky and thereafter rendered essentially non-tacky while agglomeration of the particles into large dense and difficultly soluble masses is avoided, and then collecting the product as a loose friable finely divided mass.

9. The process of making a water-soluble water-treating composition having as basic constituents a water-soluble alkali-metal phosphate glass having a molar ratio of alkali-metal oxide to phosphorus pentoxide between about 0.9:1 and about 1.7:1 and a powdered, alkali metal carbonate which comprises maintaining a gaseous humidifying zone and a contiguous drying zone, dispersing substantially simultaneously the phosphate glass and the carbonate in the humid zone, carrying them to and through the drying zone, whereby the individual particles are first subjected to humidifying conditions and thereafter to drying conditions while gas-borne, so that the surfaces of the individual glass particles are first rendered tacky and coated with the powdered alkali-metal carbonate and thereafter rendered essentially non-tacky while retaining the coating of carbonate and avoiding agglomeration of the particles into large dense masses, and then collecting the product as a loose friable finely divided mass.

10. The process of making a water-soluble water-treating composition having as basic constituents a water-soluble alkali-metal phosphate glass having a molar ratio of alkali-metal oxide to phosphorous pentoxide between about 0.9:1 and about 1.7:1 and a powdered, alkali-metal sulphite which comprises maintaining a gaseous humidifying zone and a contiguous drying zone, dispersing substantially simultaneously the phosphate glass and the sulphite in the humid zone, carrying them to and through the drying zone, whereby the individual particles are first subjected to humidifying conditions and thereafter to drying conditions while gas-borne, so that the surfaces of the individual glass particles are first rendered tacky and coated with the powdered alkali-metal sulphite and thereafter rendered essentially non-tacky while retaining the coating of sulphite and avoiding agglomeration of the particles into large dense masses, and then collecting the product as a loose friable finely divided mass.

11. The process of making a water-soluble water-treating composition having as basic constituents a water-soluble alkali-metal phosphate glass having a molar ratio of alkali-metal oxide to phosphorous pentoxide between about 0.9:1 and about 1.7:1 and a powdered mixture of alkali-metal carbonate and bicarbonate which comprises maintaining a gaseous humidifying zone and a contiguous drying zone, dispersing substantially simultaneously the phosphate glass and the mixed carbonate and bicarbonate in the humid zone, carrying them to and through the drying zone, whereby the individual particles are first subjected to humidifying conditions and thereafter to drying conditions while gas-borne, so that the surfaces of the individual glass particles are first rendered tacky and coated with the powdered mixture of alkali-metal carbonate and bicarbonate and thereafter rendered essentially non-tacky while retaining the coating of mixed carbonate and bicarbonate and avoiding agglomeration of the particles into large dense masses, and then collecting the product as a loose friable finely divided mass.

12. The process of making a water-soluble detergent composition having as basic constituents a major proportion of water-soluble alkali-metal phosphate glass having a molar ratio of alkali-metal oxide to phosphorous pentoxide between about 0.9:1 and about 1.7:1 and a powdered mixture of sodium metasilicate, sodium carbonate and disodium phosphate which comprises maintaining a gaseous humidifying zone and a contiguous drying zone, dispersing substantially simultaneously the phosphate glass and the mixed metasilicate, carbonate and disodium phosphate in the humid zone, carrying them to and through the drying zone whereby the individual particles are first subjected to humidifying condition while gas-borne, so that the surfaces of the individual glass particles are first rendered tacky and coated with the powdered mixture of metasilicate, carbonate, and disodium phosphate and thereafter rendered essentially non-tacky while retaining the coating of mixed metasilicate, carbonate and disodium phosphate and avoiding agglomeration of the particles into large dense masses, and then collecting the product as a loose, friable, finely divided mass.

13. The process of making a water-soluble detergent composition having as basic constituents a major proportion of water-soluble alkali-metal phosphate glass having a molar ratio of alkali-metal oxide to phosphorous pentoxide between about 0.9:1 and about 1.7:1 and a powdered mixture of water soluble alkali-metal carbonate and alkali-metal tripolyphosphate which comprises maintaining a gaseous humidifying zone and a contiguous drying zone, dispersing substantially simultaneously the phosphate glass and the mixed carbonate and tripolyphosphate in the humid zone, carrying them to and through the drying zone, whereby the individual particles are first subject to humidifying conditions and thereafter to drying conditions while gas-borne, so that the surfaces of the individual glass particles are first rendered tacky and coated with the powdered mixture of alkali-metal carbonate and alkali-metal polyphosphate and thereafter rendered essentially non-tacky while retaining the coating of mixed carbonate and tripolyphosphate and avoiding agglomeration of the particles into large dense masses, and then collecting the product as a loose friable finely divided mass.

14. The process of making a water-soluble detergent composition having as basic constituents a major proportion of water-soluble alkali-metal phosphate glass having a molar ratio of alkali-metal oxide to phosphorous pentoxide between about 0.9:1 and about 1.7:1 and a powdered detergent which comprises maintaining a gaseous humidifying zone and a contiguous drying zone, dispersing substantially simultaneously the phosphate glass and the powdered detergent in the humid zone, carrying them to and through the drying zone, whereby the individual particles are first subjected to humidifying conditions and thereafter to drying conditions while gas-borne, so that the surfaces of the individual glass particles are first rendered tacky and coated with the powdered detergent and thereafter rendered essentially non-tacky while retaining the coating of detergent and avoiding agglomeration of the particles into large dense masses, and then collecting the product as a loose friable, finely divided mass.

ROBERT W. LIDDELL, Jr.

REFERENCES CITED

The following references are of record in the file of this patent:

UNITED STATES PATENTS

| Number | Name | Date |
|---|---|---|
| 2,494,828 | Munter | Jan. 17, 1950 |

Certificate of Correction

Patent No. 2,572,359                                      October 23, 1951

ROBERT W. LIDDELL, Jr.

It is hereby certified that error appears in the printed specification of the above numbered patent requiring correction as follows:

Column 7, line 11, after "to", second occurrence, insert *about*;

and that the said Letters Patent should be read as corrected above, so that the same may conform to the record of the case in the Patent Office.

Signed and sealed this 12th day of February, A. D. 1952.

[SEAL]

THOMAS F. MURPHY,
*Assistant Commissioner of Patents.*